United States Patent
Mukai et al.

(10) Patent No.: US 6,669,532 B1
(45) Date of Patent: Dec. 30, 2003

(54) DEVICE AND METHOD FOR COOL AIR COOLING TYPE MACHINING

(75) Inventors: Ryohei Mukai, Kariya (JP); Mamoru Katsuta, Kariya (JP); Takayuki Yoshimi, Kariya (JP); Koji Nishi, Kariya (JP); Naoto Ono, Kariya (JP); Yoshihiro Mizutani, Kariya (JP); Yasunori Kobayashi, Toyota (JP); Tadashi Kumazawa, Toyota (JP); Masaaki Sato, Toyota (JP); Yuji Kubo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/582,412

(22) PCT Filed: Dec. 22, 1998

(86) PCT No.: PCT/JP98/05796
§ 371 (c)(1),
(2), (4) Date: Aug. 10, 2000

(87) PCT Pub. No.: WO99/33609
PCT Pub. Date: Jul. 8, 1999

(30) Foreign Application Priority Data

Dec. 24, 1997  (JP) ............................................. 9-366019

(51) Int. Cl.⁷ ............................. B24B 5/04; B24B 55/02
(52) U.S. Cl. ............................... 451/7; 451/449; 451/53
(58) Field of Search ................................. 451/449, 450, 451/443, 251, 243, 242, 56, 53, 28, 7

(56) References Cited

U.S. PATENT DOCUMENTS

| | | | | |
|---|---|---|---|---|
| 3,594,953 A | * | 7/1971 | Stade | .......................... 451/141 |
| 3,696,564 A | | 10/1972 | Joyce | |
| 3,834,088 A | | 9/1974 | Matson | |
| 4,315,384 A | | 2/1982 | Roos | |
| 5,833,523 A | * | 11/1998 | Hykes | .......................... 451/450 |
| 6,305,183 B1 | * | 10/2001 | Mukai et al. | ................. 451/450 |
| 6,328,636 B1 | * | 12/2001 | Yoshimi et al. | ................ 451/56 |

FOREIGN PATENT DOCUMENTS

| | | |
|---|---|---|
| GB | 1546590 | 5/1979 |
| JP | 50-84981 | 7/1975 |
| JP | 51-2676 | 1/1976 |
| JP | 52-17293 | 2/1977 |

(List continued on next page.)

OTHER PUBLICATIONS

"Production Machining Technology for Harmonization with Environment, Cutting and Grinding Techniques Using Cold Gas for Protecting Environment, and Realization of ISO 14000", *Machines and Tools*, Nov. 1, 1996, pp. 7–17 and 212.

"Study of Environment Conscious CBN Cooling Air Grinding Technology", *Seimitsu Kougakkaishi*, vol. 62, No. 11, 1996, pp. 1638–1642.

*Primary Examiner*—Robert A. Rose
(74) *Attorney, Agent, or Firm*—Burns, Doane, Swecker & Mathis, LLP

(57) ABSTRACT

A cold-gas-blow-cooling type machining apparatus including a relative movement device which moves a workpiece and a machining tool relative to each other, and a cold-gas-blow supply device which supplies a cold gas blow to a machining point at which the workpiece is machined by the machining tool. The machining apparatus includes: a workpiece-temperature detecting device which detects a temperature of the workpiece; and a machining-condition control device which controls at least one of the relative movement device and the cold-gas-blow supply device, on the basis of the detected temperature of the workpiece. The machining-condition control device includes a cooling-condition control device which controls the cold-gas-blow supply device so as to control at least one of a temperature and a flow rate of the cold gas blow.

20 Claims, 10 Drawing Sheets

FOREIGN PATENT DOCUMENTS

| | | |
|---|---|---|
| JP | 52-39876 | 3/1977 |
| JP | 56-9166 | 1/1981 |
| JP | 60-28635 | 7/1985 |
| JP | 61-164779 | 7/1986 |
| JP | 63-35574 | 3/1988 |
| JP | 63-22044 | 6/1988 |
| JP | 63-62339 | 12/1988 |
| JP | 57-100453 | 12/1988 |
| JP | 1-153257 | 6/1989 |
| JP | 1-153271 | 6/1989 |
| JP | 1-121650 | 8/1989 |
| JP | 2-30203 | 8/1990 |
| JP | 3-49860 | 3/1991 |
| JP | 4-48584 | 8/1992 |
| JP | 5-84637 | 4/1993 |
| JP | 5-169345 | 7/1993 |
| JP | 6-59624 | 8/1994 |
| JP | 7-32245 | 2/1995 |
| JP | 7-132462 | 5/1995 |
| JP | 2568975 | 10/1996 |
| SU | 0601145 * | 4/1978 ................ 451/7 |

* cited by examiner

FIG. 5

|  |  | $(T-t_0) < B_2$ | $B_2 \leq (T-t_0) \leq B_1$ | $(T-t_0) > B_1$ |
|---|---|---|---|---|
| $dT > A_1$ | FLOW RATE | HOLD | INCREASE | INCREASE |
|  | TEMPERATURE | HOLD | LOWER | LOWER |
| $A_2 \leq dT \leq A_1$ | FLOW RATE | REDUCE | HOLD | INCREASE |
|  | TEMPERATURE | HEIGHTEN | HOLD | LOWER |
| $dT < A_2$ | FLOW RATE | REDUCE | REDUCE | HOLD |
|  | TEMPERATURE | HEIGHTEN | HEIGHTEN | HOLD |

DEVICE AND METHOD FOR COOL AIR COOLING TYPE MACHINING

TECHNICAL FIELD

The present invention relates to machining apparatus and process in which a cold-gas-blow cooling is used.

BACKGROUND ART

In a grinding, cutting or other machining operation, a grinding or cutting oil or other liquid coolant (hereinafter referred to as a liquid coolant) is used conventionally for cooling a workpiece and a machining tool, thereby preventing a burning at a grinding or cutting point and removing cutting chips during the machining operation. Recently, in the interest of improving the working environment, there is designed a machining process with cold-gas-blow cooling in which a flow of cold gas (a stream of a gas having a low temperature) is used in place of the liquid coolant. This machining process with the cold-gas-blow cooling is advantageous over the conventional machining process in which the liquid coolant is used for cooling the workpiece and the machining tool, for example, in terms of freedom from splashes of the liquid coolant and also easier recycling of the cutting chips. However, since the gas used in the machining process with the cold-gas-blow cooling has a lower thermal conductivity and a smaller thermal capacity than those of the liquid, heat generated at the machining point is not sufficiently removed by the gas. Thus, the workpiece and the machining tool are likely to be affected by the generated heat, possibly causing problems such as deterioration of dimensional accuracy due to thermal expansion of the workpiece and deterioration of machining performance of the machining tool.

JP-A-56-9166 discloses a machining process including a machining step of machining the workpiece with a supply of a liquid coolant, and a cold-gas-blow machining-tool cooling step of cooling the machining tool with a supply of a cold gas blow. That is, when the workpiece has a predetermined dimension as a result of machining of the workpiece in the machining step, the machining step is followed by the cold-gas-blow machining-tool cooling step. In the cold-gas-blow machining-tool cooling step, the cold gas blow is supplied to the machining tool until the temperature of the machining tool (the temperature of the atmosphere within a cover covering the machining tool) is lowered to a predetermined temperature or less.

It is possible to apply this technique disclosed in the publication to a machining process having a machining step in which the liquid coolant is replaced by the cold gas blow such that the flow rate of the cold gas blow is controlled on the basis of the temperature of the machining tool during the machining operation. However, in this machining process, it is not possible to assure a sufficient cooling effect, thereby causing thermal expansion of the workpiece and deterioration of cutting performance of the machining tool, and possibly deteriorating machining accuracy.

DISCLOSURE OF INVENTION

The object of the present invention is to obtain a cold-gas-blow cooling machining process and a cold-gas-blow-cooling type machining apparatus which are capable of minimizing thermal influences on the workpiece and the machining tool. This object may be achieved by a machining apparatus or process according to any one of the following modes of the present invention, which are numbered and dependent from each other, where appropriate. It is to be understood that the following modes are provided to facilitate the understanding of the present invention, and that the technical features and the combinations of the technical features disclosed in the present specification are not limited to the following modes.

(1) A cold-gas-blow-cooling type machining apparatus including a relative movement device which moves a workpiece and a machining tool relative to each other, and a cold-gas-blow supply device which supplies a cold gas blow to a machining point at which the workpiece is machined by the machining tool, the machining apparatus being characterized by including:

a workpiece-temperature detecting device which detects a temperature of the workpiece; and a machining-condition control device which controls at least one of the relative movement device and the cold-gas-blow supply device, on the basis of the temperature of the workpiece which is detected by the workpiece-temperature detecting device.

In the cold-gas-blow-cooling type machining apparatus described in the present mode, the temperature of the workpiece is detected by the workpiece-temperature detecting device. This workpiece-temperature detecting device may include a contact-type surface-temperature detecting device which is adapted to detect the temperature of the surface of the workpiece with its temperature sensor being brought into contact with the surface of the workpiece, or alternatively may include a non-contact-type surface-temperature detecting device which is adapted to detect the temperature on the basis of a radiant energy radiated from the workpiece. Since the workpiece radiates an electromagnetic wave having a wavelength distribution and an intensity which vary depending upon the temperature of the workpiece, the non-contact-type surface-temperature detecting device can detect the temperature of the workpiece without contact thereof with the workpiece, for example, by detecting a temperature rise of a subject body which is irradiated with the electromagnetic wave, or by detecting the intensity or wavelength of the electromagnetic wave. The non-contact-type surface-temperature detecting device may be a radiation thermometer or a thermography, for example.

The workpiece is one of sources which generate heat during the machining operation, and the generated heat directly affects the machining accuracy of the workpiece. In this view, it is appropriate to control the machining condition on the basis of the temperature of the workpiece. Where the cold-gas-blow supply device and the relative movement device are controlled on the basis of the temperature of the workpiece, the machining point can be effectively cooled, even where the cold gas blow has thermal capacity smaller than that of the liquid coolant, making it possible to obtain a suitable cooling effect. Thus, it is possible to minimize thermal expansion of the workpiece and deterioration of the machining performance of the machining tool, and accordingly minimize deterioration of the machining accuracy. That is, since the machining accuracy eventually affects the workpiece, the machining accuracy can be more effectively improved where the machining condition is controlled on the basis of the temperature of the workpiece, than where the machining condition is controlled on the basis of the temperature of the machining tool.

Further, in the cold-gas-blow-cooling type machining apparatus described in the present mode in which the liquid coolant is not used at all, there is no risk of deterioration of the working environment due to use of the liquid coolant.

It is noted that the cold-gas-blow-cooling type machining apparatus described in the present mode can be advantageously applied to a metallic-workpiece machining apparatus designed to machine a metallic workpiece which tends to be considerably thermally expanded in the machining operation. The cold-gas-blow-cooling type machining apparatus of the present mode in which the cutting condition is controlled on the basis of the temperature of the workpiece is suitable for machining a workpiece made of aluminum, copper, casting or other material having a comparatively large coefficient of linear expansion.

(2) A cold-gas-blow-cooling type machining apparatus according to mode (1), wherein the relative movement device includes a spindle which holds the workpiece and rotates the workpiece about an axis of the workpiece.

In the cold-gas-blow-cooling type machining apparatus described in the present mode, the workpiece is held and rotated by the spindle. The rotated workpiece and the machining tool are further moved relative to each other in at least one direction, whereby the workpiece is machined by the machining tool. The cold-gas-blow-cooling type machining apparatus of the present mode may be, for example, a lathe, or a grinding machine (e.g., a cylindrical grinding machine, an internal cylindrical grinding machine, and a centerless grinding machine).

(3) A cold-gas-blow-cooling type machining apparatus according to mode (2), wherein the temperature detecting device includes a detecting portion opposed to a point that lies on a circle on which the machining point lies and that is spaced apart from the machining point circumferentially of the workpiece, the circle having a center on the axis.

In the cold-gas-blow-cooling type machining apparatus described in the present mode, the temperature of the heat generation as a result of the machining operation can be accurately detected.

(4) A cold-gas-blow-cooling type machining apparatus according to any one of modes (1)–(3), wherein the machining-condition control device includes a cooling-condition control device which controls the cold-gas-blow supply device so as to control at least one of a temperature and a flow rate of the cold gas blow.

The control of the temperature and flow rate of the cold gas blow on the basis of the temperature of the workpiece makes it easy to perform a suitable cooling.

(5) A cold-gas-blow-cooling type machining apparatus according to mode (4), wherein the cooling-condition control device includes a workpiece-temperature controlling portion which controls at least one of the temperature and the flow rate of the cold gas blow such that the temperature of the workpiece is held within a predetermined range.

The temperature or flow rate of the cold gas blow is controlled such that the temperature of the workpiece is held between the upper and lower threshold values of the predetermined range. This control makes it possible to minimize a variation in the machining temperature during machining of the individual workpieces by the machining apparatus, thereby improving the machining accuracy. Further, it is possible to prevent the machining point from being excessively cooled, thereby minimizing an unnecessary consumption of energy by the cold-gas-blow supply device.

(6) A cold-gas-blow-cooling type machining apparatus according to any one of modes (1)–(5), wherein the machining-condition control device includes a relative-movement-condition control device which controls the relative movement device so as to control at least one of a velocity and an amount of relative movement of the workpiece and the machining tool.

Where the machining resistance is optimized by controlling the velocity of the relative movement of the workpiece and the machining tool on the basis of the temperature of the workpiece, it is possible to efficiently machine the workpiece while preventing an excessive rise of the surface temperature of the workpiece during the machining operation. Thus, the control of the velocity of the relative movement makes it possible to effectively cool the machining point even by the cold gas blow which has small thermal capacity. Further, where the amount of the relative movement is controlled on the basis of the temperature, it is possible to control a movement-stop position (final position) of the machining tool, by taking account of the thermal expansion of the workpiece. Thus, the control of the amount of the relative movement makes it possible to improve the machining accuracy of the workpiece.

The "relative movement" recited in the present mode may be a relative movement of the machining tool and the workpiece in a direction perpendicular to a machined surface of the workpiece (hereinafter simply referred to as the perpendicular direction) or a direction parallel to the machined surface of the workpiece (hereinafter simply referred to as the parallel direction). The velocity and amount of the relative movement in the perpendicular direction, or the velocity of the relative movement in the parallel direction may be controlled. Alternatively, both of them may be controlled.

Where the machining apparatus according to the present mode is applied to a cylindrical grinding machine so that a plunge grinding is performed by the cylindrical grinding machine, the velocity and amount of the relative movement of the grinding wheel and the workpiece W in the perpendicular direction (radial direction) are controlled. As described below in BEST MODE FOR CARRYING OUT THE INVENTION, where the relative movement device is controlled such that the grinding wheel and the workpiece are moved (fed) alternately toward and away from each other so that the workpiece W is intermittently ground by the grinding wheel, it takes a longer time to grind the workpiece by a predetermined amount, than where the workpiece W is continuously ground by the grinding wheel. Thus, where the workpiece W is intermittently ground by the grinding wheel, the average velocity of the relative movement in the perpendicular direction is considered to be reduced. Where a transverse grinding is performed by the cylindrical grinding machine, at least one of the relative movement in the perpendicular direction (radial direction or cutting depth direction) and the relative movement in the parallel direction (axial direction or feed direction) is controlled. The machining resistance can be increased or reduced also by increasing or reducing the velocity of the relative movement in the feed direction.

(7) A cold-gas-blow-cooling type machining apparatus according to mode (6), wherein the relative-movement-condition control device includes a machining-velocity reducing portion which reduces the velocity of the relative movement when the temperature of the workpiece rises to a predetermined temperature.

When the temperature of the workpiece rises to the predetermined temperature, the velocity of the relative movement in the perpendicular or parallel direction is reduced, thereby reducing the machining resistance and accordingly minimizing the heat generation amount. The machining velocity can be reduced also by intermittently machining the workpiece, and can be further reduced by prolonging a time of interruption of the machining in the intermittent machining.

(8) A cold-gas-blow-cooling type machining apparatus according to any one of modes (1)–(7), wherein the machining-condition control device includes a provisional target-dimension determining portion which calculates a provisional target-dimension of the workpiece as a target dimension of the workpiece upon completion of machining of the workpiece, on the basis of the temperature of the workpiece detected by the workpiece-temperature detecting device, and a provisional-target-dimension-basis relative-movement control portion which controls the relative movement device on the basis of the provisional target-dimension which is determined by the provisional-target-dimension determining portion, such that the machining is completed when the workpiece has the provisional target-dimension.

The provisional target-dimension is compensated on the basis of the temperature of the workpiece, thereby making it possible to perform a highly accurate machining even if the thermal expansion of the workpiece is increased due to the small thermal capacity of the cold gas blow. That is, the workpiece is machined while it is being thermally expanded, and the workpiece is then contracted when the temperature is lowered to the normal temperature. The contraction amount is larger where the temperature of the workpiece during the machining operation is comparatively high, than where the temperature during the machining operation is comparatively low. In this view, if the provisional target-dimension is compensated such that the provisional target-dimension is made larger where the temperature during the machining operation is comparatively high, than where the temperature is comparatively low, it is possible to minimize a variation in the dimension of the workpiece after the temperature has been lowered to the normal temperature, thereby improving the machining accuracy of the workpiece.

The provisional target-dimension of the workpiece is thus determined on the basis of the temperature of the workpiece. It is preferable to determine the provisional target-dimension by taking account of also the coefficient of linear expansion of the workpiece, a definitive target-dimension of the workpiece at a standard temperature, and other factors. For example, the provisional target-dimension d can be obtained according to the following equation:

$$d = D \times \{1 + \alpha(t-T)\}$$

wherein D, t, and $\alpha$ represent the definitive target-dimension of the workpiece at the standard temperature T, the detected temperature of the workpiece, and the coefficient of linear expansion of the workpiece, respectively. Further, for obtaining the provisional target-dimension, it is also possible to take account of a hardness, elastic coefficient or other physical properties of the workpiece, the temperature of the machining tool, the temperature of the body of the machining apparatus, and the external temperature, in addition to the coefficient of linear expansion of the workpiece.

(9) A cold-gas-blow-cooling type machining apparatus according to any one of modes (1)–(8), wherein the cold-gas-blow supply device includes a first cold-gas-blow supply device which supplies the cold gas blow to the machining point, and a second cold-gas-blow supply device which supplies the cold gas blow to a portion of the workpiece that is different from the machining point.

The workpiece, whose machining accuracy is directly affected by the heat generation, can be more sufficiently cooled even by the cold gas blow where the portion different from the machining point also is cooled, than where the cold gas blow is supplied to only the machining point. Further, since the flow rate and temperature of the cold gas blow supplied from the second cold-gas-blow supply device, as well as the flow rate and temperature of the cold gas blow supplied from the first cold-gas-blow supply device, are controlled, the temperature and dimension of the workpiece can be further accurately controlled. The first and second cold-gas-blow supply devices may include common devices and respective exclusive devices. That is, the two cold-gas-blow supply devices may commonly use a tank, a compressor and a cooling device, and use respective conduits and supply nozzles. Alternatively, each of the two cold-gas-blow supply devices may exclusively use a tank, a compressor, a cooling device, a conduit and a supply nozzle.

Where the workpiece is rotatably held by the spindle, it is preferable that the second cold-gas-blow supply device supply the cold gas blow on the downstream side of the machining point of the workpiece in the rotating direction. The supply of the cold gas blow on the downstream side of the machining point makes it possible to effectively cool the point which is particularly heated during the machining operation. If the portion to which the cold gas blow is supplied by the second cold-gas-blow supply device is located on the downstream side of the machining point and is adjacent to the machining point, this portion can be cooled immediately after the portion is heated.

Further, the cold-gas-blow supply device may further include a machining-tool cold-gas-blow supply device which cools the machining tool with the cold gas blow, thereby further improving the cooling effect.

The machining-condition control device does not necessarily have to control both of the first and second cold-gas-blow supply devices, but has only to control either one of them. Where one of them is controlled, it is preferable to control the second cold-gas-blow supply device. It is preferable to permit the first cold-gas-blow supply device to always carry out the sufficient cooling performance, since the first cold-gas-blow supply device serves to supply the cold gas blow to the machining point. This means a relatively small need for controlling the temperature and flow rate of the cold gas blow supplied from the first cold-gas-blow supply device. The temperature and flow rate of the cold gas blow supplied from the second cold-gas-blow supply device, on the other hand, can be advantageously controlled over wider ranges, whereby the workpiece can be suitably cooled, avoiding an unnecessary energy consumption while improving the cooling effect. If both of the first and second cold-gas-blow supply devices are controlled, it is possible to control the temperature of the workpiece with an improved response.

(10) A cold-gas-blow-cooling type machining apparatus according to mode (9), further comprising a covering member which covers at least the portion to which the cold gas blow is supplied by the second cold-gas-blow supply device such that the covering member and the portion are spaced apart from each other by a suitable distance, whereby the covering member guides the cold gas blow along a surface of the workpiece.

The cold gas blow is permitted to stream along the surface of the workpiece, owing to the provision of the covering member that covers the portion of the workpiece to which portion the cold gas blow is supplied, thereby increasing the cooling effect. The covering member has only to cover at least the portion to which the cold gas blow is supplied, and may cover the portion and its periphery as well, or alternatively cover a major part of the workpiece. It is noted that the covering member can be considered as a component constituting a part of the second cold-gas-blow supply device.

(11) A cold-gas-blow-cooling type machining apparatus according to mode (10), wherein the covering member is movable toward and away from the workpiece.

The covering member has only to be movable toward and away from the workpiece. The covering member may be removable from the machining apparatus, or may be linearly movable or rotatable. In any one of these cases, it is possible to suitably move the covering member, such that the covering member does not interfere with an operation to set the workpiece in the machining apparatus, or such that the cooling effect is further increased.

(12) A cold-gas-blow cooling machining process of machining a workpiece, which is attached to a spindle, by a machining tool with a relative movement of the workpiece and the machining tool, while supplying a cold gas blow to a machining point at which the workpiece is machined by the machining tool, the machining process being characterized by:

monitoring a temperature of the workpiece, and holding a variation in the temperature caused by machining of the workpiece by the machining tool, within a predetermined range.

According to the machining process described in the present mode, the variation in the temperature of the workpiece can be held within the predetermined range, thereby providing an improved machining accuracy and some other advantages.

(13) A cold-gas-blow cooling machining process of machining a workpiece, which is attached to a spindle, by a machining tool with a relative movement of the workpiece and the machining tool, while supplying a cold gas blow to a machining point at which the workpiece is machined by the machining tool, the machining process being characterized by:

controlling at least one of a temperature and a flow rate of the cold gas blow, on the basis of a temperature of the workpiece.

(14) A cold-gas-blow cooling machining process of machining a workpiece, which is attached to a spindle, by a machining tool with a relative movement of the workpiece and the machining tool, while supplying a cold gas blow to a machining point at which the workpiece is machined by the machining tool, the machining process being characterized by:

controlling at least one of an amount of the relative movement of the workpiece and the machining tool, and a velocity of the relative movement, on the basis of a temperature of the workpiece.

(15) A cold-gas-blow cooling machining process according to mode (14), further comprising a velocity reducing step of reducing a velocity of the relative movement when the temperature of the workpiece rises to a predetermined temperature.

The velocity reducing step includes an intermittently machining step, as described above. Where the cold-gas-blow cooling machining step according to the present invention is applied to a plunge grinding performed in a cylindrical grinding machine, for example, the movement of the grinding wheel and the workpiece W toward each other is suspended at a point of the time when the temperature of the workpiece rises to a machining suspending temperature. The grinding wheel and the workpiece W are then moved away from each other. At the time when the temperature is lowered to a machining resuming temperature, the grinding wheel and the workpiece W are moved toward each other again.

(16) A cold-gas-blow cooling machining process according to mode (14) or (15), further comprising a step of determining a provisional target-dimension of the workpiece as a target dimension of the workpiece upon completion of machining of the workpiece, on the basis of the temperature of the workpiece, a coefficient of linear expansion of the workpiece, and a definitive target-dimension of the workpiece as a target dimension of the workpiece at a standard temperature, and a step of controlling the amount of the relative movement of the workpiece and the machining tool, on the basis of the provisional target-dimension.

(17) A cold-gas-blow cooling machining process according to any one of modes (12)–(16), wherein the cold gas blow is supplied to the machining point and also a portion of the workpiece which is distant from the machining point.

BRIEF DESCRIPTION OF DRAWINGS

FIG. 5 is a table showing a map of controlling amount (temperature) of a cooling air which map is stored in ROM of a control device which is included in the above-described cylindrical grinding machine.

BEST MODE FOR CARRYING OUT THE INVENTION

One common embodiment of the present invention in the form of a cold-gas-blow-cooling type machining apparatus will be explained in detail on the basis of the drawings. This cold-gas-blow-cooling type machining apparatus is capable of carrying out a cold-gas-blow cooling machining process as one common embodiment of the present invention.

Figure 2:
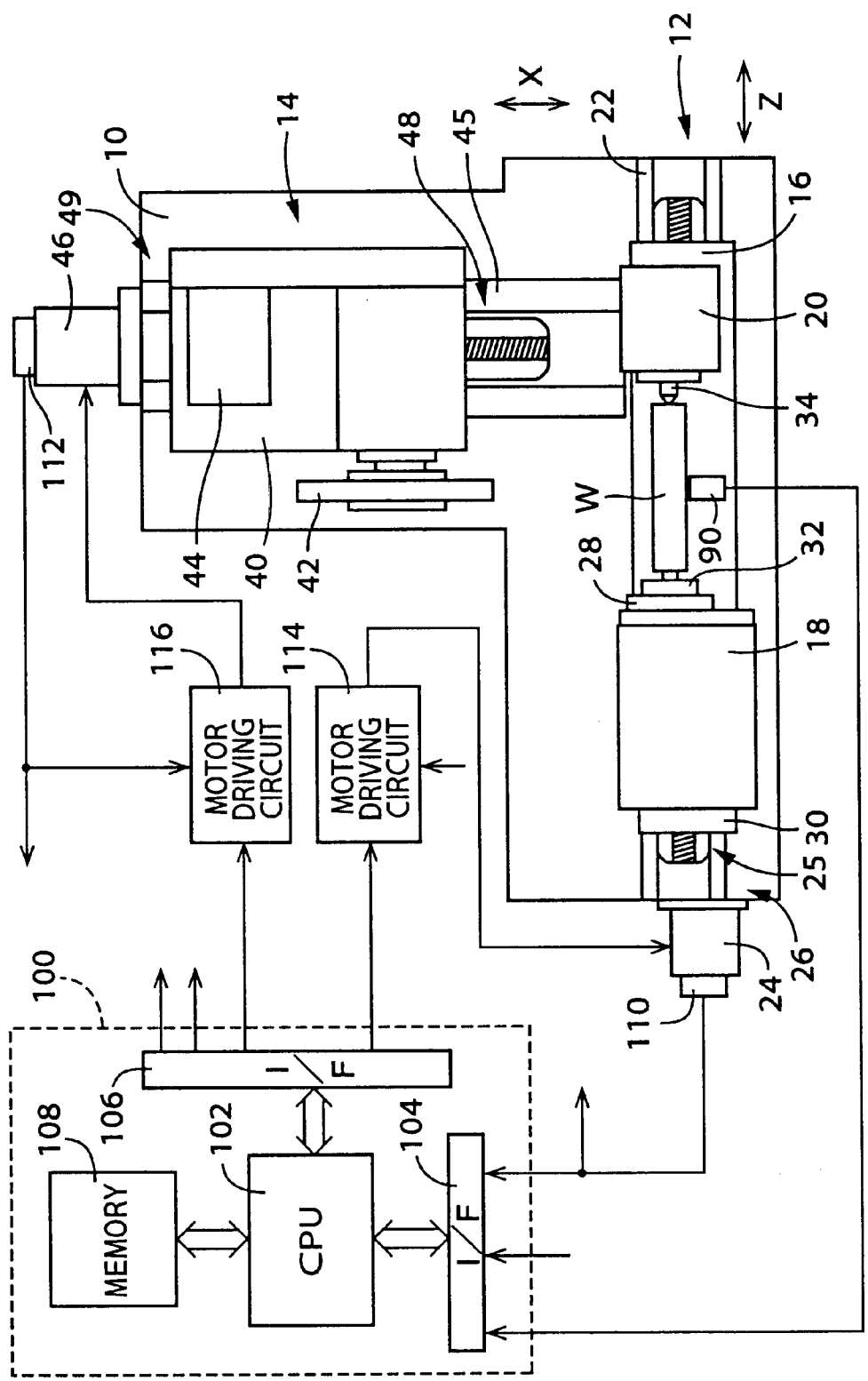
FIG. 2 is a plan view showing the entirety of the above-described cylindrical grinding machine.

FIG. 2 shows the entirety of a cylindrical grinding machine as the cold-gas-blow-cooling type machining apparatus. The cylindrical grinding machine includes a bed 10 which has a workpiece supporting portion 12 and a machining-tool supporting portion 14. The workpiece supporting portion 12 includes a table 16 which is movable relative to the bed 10, a headstock 18 which is fixedly disposed on the table 16, and a tailstock 29 which is movable toward and away from the headstock 18. The table 16 is movable along a pair of rails 22 which are disposed on the bed 10. The table 16 is moved in Z-axis direction by a servo motor 24 via a feed screw device 25. The rails 22, the servo motor 24 and the feed screw device 25 cooperate with each other to constitute a movement device 26. On the headstock 18, there are mounted a spindle 28 and an electric motor 30 which rotates the spindle 28. A workpiece W is held by a workpiece holding portion 32 of the spindle 28 and a tailstock spindle 34 of the tailstock 20, so as to be rotatable about its axis. The workpiece W is made of an aluminum alloy in the present embodiment.

The machining-tool supporting portion 14 includes a wheel spindle stock 40, a grinding wheel 42 which is attached to the wheel spindle stock 40 rotatably about its rotary axis, and an electric motor 44 which rotates the grinding wheel 42. On the bed 10, there is disposed a pair of rails 45 extending in the X-axis direction which is perpendicular to the above-described pair of rails 22. The wheel spindle stock 40 is moved along the rails 45 by a servo motor 46 via a feed screw device 48. The rails 45, the servo motor 46 and the feed screw device 48 cooperate with each other to constitute a movement device 49.

The grinding wheel 42 and the workpiece W are moved relative to each other by the movement of the wheel spindle stock 40 in the X-axis direction and the movement of the table 16 in the Z-axis direction, so that the outer circumferential surface of the workpiece W is ground. The present cylindrical grinding machine performs a traverse grinding in which the cylindrical workpiece W is ground over its entire axial length, and also a plunge grinding in which the workpiece W is ground at an axial part thereof. The plunge grinding is sometimes performed without any movement of the workpiece W in the Z-axis direction. However, the plunge grinding is generally performed with the movements of the workpiece W in the Z-axis direction as well as in X-axis direction, although the movement amount in the Z-axis direction is small. The X-axis direction in which the wheel spindle stock 16 is moved is the direction of depth of cut where the traverse grinding is performed, and is the direction of feed where the plunge grinding is performed. The Z-axis direction in which the workpiece W is moved is the direction of feed where the traverse grinding is performed and also where the plunge grinding is performed.

Figure 1:
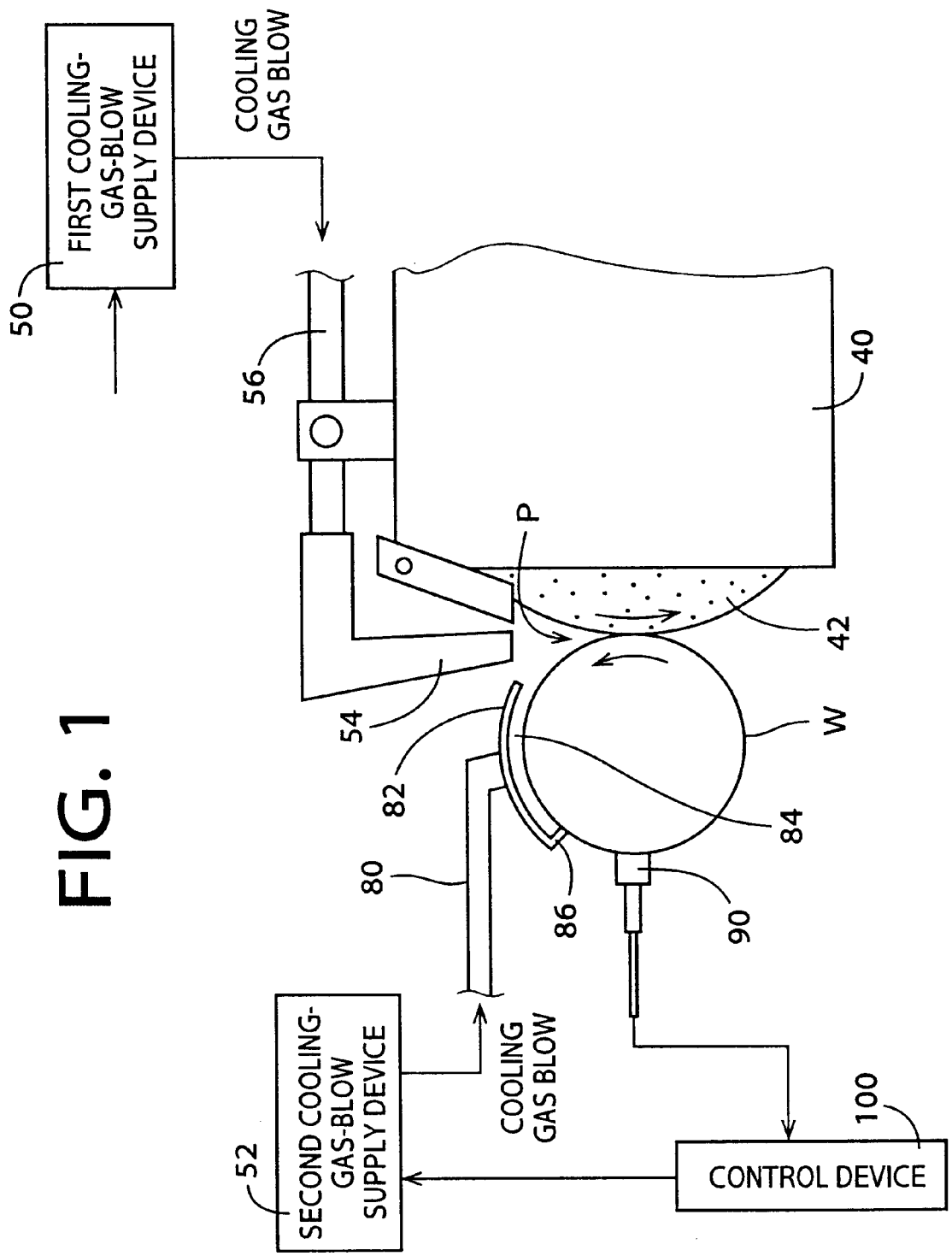
FIG. 1 is a view schematically illustrating an essential part of a cold-gas-blow-cooling type machining apparatus in the form of a cylindrical grinding machine according to one embodiment of the present invention.
Figure 3:
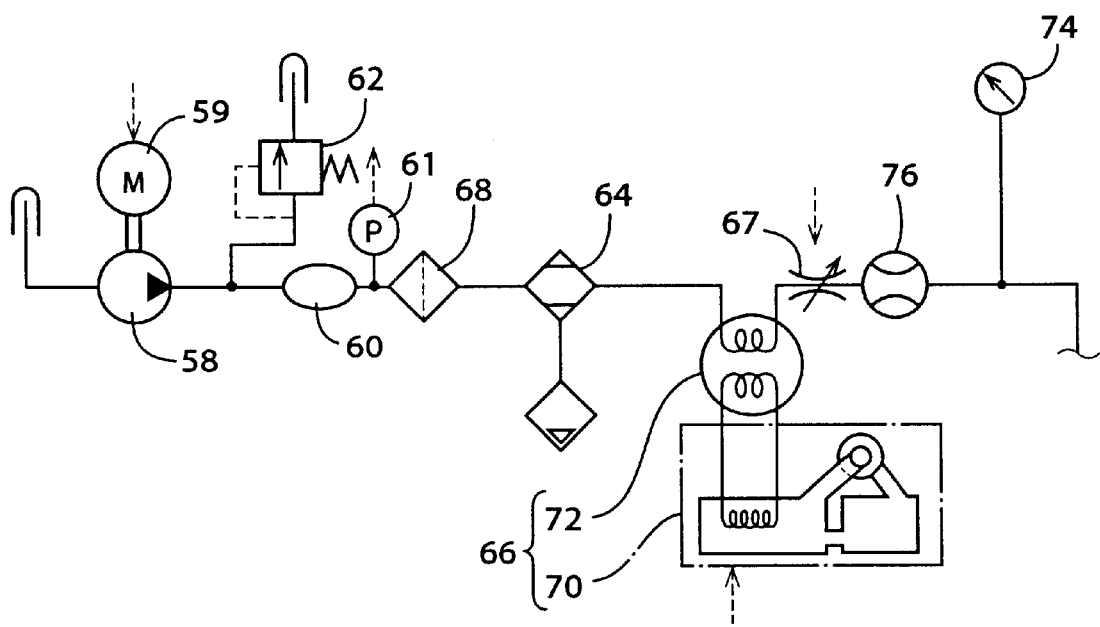
FIG. 3 is a circuit diagram showing an air supply device which is included in the above-described cylindrical grinding machine.

The present cylindrical grinding machine is equipped with two cold-gas-blow supply devices in the form of cooling-gas-blow supply devices 50, 52, as shown in FIG. 1. The first cooling-gas-blow supply device 50 supplies a cooling gas blow to a grinding point P at which the workpiece W is ground by the grinding wheel 42. The first cooling-gas-blow supply device 50 is connected to a conduit 56, and a grinding cooling nozzle 54 is attached to the distal end of the conduit 56. The grinding cooling nozzle 54 is located above the grinding point P, so that the cooling gas blow is supplied downward from the grinding cooling nozzle 54 toward the grinding point P. The first cooling-gas-blow supply device 50 is adapted to suck and compress the ambient air thereby cooling the air, and includes a pump 58, a motor 59 for driving the pump 58, a tank 60, a pressure switch 61 for detecting a pressure of the air accumulated in the tank 60, a relief valve 62, a drier 64, a cooling device 66 and a flow regulating valve 67, as shown in FIG. 3.

The air compressed by the pump 58 is accumulated in the tank 60 which serves to minimize a pulsating flow of the air. The motor 59 for driving the pump 58 is controlled depending upon the state of the pressure switch 61, such that the pressure of the air accumulated in the tank 60 is held within a predetermined range. In the present embodiment, when the pressure of the air in the tank 60 falls below a lower limit of the predetermined range, the pressure switch 61 is switched from its ON state to its OFF state. The switching of the pressure switch 61 from the ON state to the OFF state causes the motor 59 to be turned on. When the pressure of the air is raised to an upper limit of the predetermined range, the pressure switch 61 is switched from the OFF state to the ON state, whereby the motor 59 is turned off. The relief valve 62 is provided to prevent the pressure of the compressed air delivered from the pump 58, from being excessively increased. The air supplied from the tank 60 flows through a filter 68 and the drier 64, and is then cooled by the cooling device 66 which includes a refrigerating cycle 70 and a heat exchanger 72. A coolant is forced to be cooled by the refrigerating cycle 70, and the air passing through the heat exchanger 72 is cooled such that the temperature of the air is lowered to a predetermined temperature. In the heat exchanger 72, the air may be cooled directly by the coolant, or alternatively may be cooled by a fluid which has been cooled by the coolant. By controlling the temperature of the coolant cooled in the refrigerating cycle 70, or by controlling amount of the coolant circulating through the refrigerating cycle 70, for example, it is possible to control the temperature of the air passing through the heat exchanger 72. The air which has passed through the heat exchanger 72 is supplied to the grinding point P, flowing through the flow regulating valve 67, the conduit 56 and the grinding cooling nozzle 54. The rate of flow of the cooling gas blow supplied from the grinding cooling nozzle 54 is controlled by controlling the flow regulating valve 67. The pressure and flow rate of the air flowing through the conduit 56 are detected by a pressure gage 74 and a flow meter 76, respectively. Thus, the first cooling-air supply device 50 serves to supply the air in the form of the cold gas blow, and the flow rate and the temperature of the supplied cold gas blow is controllable by the flow regulating valve 67 and the cooling device 66, respectively.

The pressure switch 61 may be replaced by a pressure sensor, so that the activation of the motor 59 is controlled on the basis of the pressure of the air detected by the pressure sensor. Also in this case, the pressure of the air accumulated in the tank 60 can be held within the predetermined range.

The second cooling-air supply device 52 supplies the cold gas blow to a portion of the outer circumferential surface of the workpiece W which portion is different from the grinding point P. A workpiece cooling conduit 80 extends from the second cooling-air supply device 52, and is attached to a workpiece cooling cover 82 which covers the workpiece W. The workpiece cooling conduit 80 opens in a space within the workpiece cooling cover 82. Since the second cooling-air supply device 52 has a construction identical with that of the first cooling-air supply device 50, the construction of the second cooling-air supply device 52 will not be explained.

The workpiece cooling cover 82 extends over a suitable distance in the axial direction of the spindle 28, and has an arcuate shape having a suitable center angle. As shown in the figure, the workpiece cooling cover 82 is positioned so as to cover a portion of the outer circumferential surface of the workpiece W which portion is in the vicinity of the grinding point P and which portion is on the downstream side of the grinding point P in the rotating direction, and so as to be spaced apart from the outer circumferential surface of the workpiece W by a suitable spacing 84. Thus, the second cooling-air supply device 52 supplies the cooling air on the downstream side of the grinding point P, thereby rapidly cooling the portion of the workpiece W which has been heated by the grinding the workpiece W. The workpiece cooling cover 82 is bent toward the outer circumferential surface of the workpiece W at one of its opposite end portions which is remote from the grinding point P in the rotating direction, and at its opposite end portions which are opposed to each other in the axial direction. Thus, the workpiece cooling cover 82, as a whole, has a hook shape. The bent end portions cooperate with each other to constitute a flange portion 86 having a distal end which is held in proximity to the outer circumferential surface of the workpiece W. The spacing 84, which is defined by the outer circumferential surface of the workpiece W and the inner arcuate surface of the workpiece cooling cover 82, opens substantially in only a direction toward the grinding point P, thereby minimizing radiation of the cooling air from the spacing 84, and making it possible to effectively cool the outer circumferential surface of the workpiece W. Further, the cooling air supplied from the second cooling air supply device 52 is guided along the outer circumferential surface of the workpiece W by the workpiece cooling cover 82, whereby the outer circumferential surface of the workpiece W is suitably cooled. It is preferable that the workpiece cooling cover 82 be displaceable depending upon the diameter of the workpiece W, so that the opening area of the workpiece cooling cover 82 and the volume of the spacing 84 are held substantially constant. The workpiece cooling cover 82 may be attached to either of the workpiece supporting portion 12 and the machining-tool supporting portion 14. Where the workpiece cooling cover 82 is attached to the workpiece supporting portion 12, the workpiece cooling cover 82 has to be movable relative to the table 16. This is because, in the present cylindrical grinding machine, the grinding point P of the workpiece W is moved with the movement of the table 16 relative to the bed 10 in the Z-axis direction, while the grinding point P is not moved relative to the bed 10. Where the workpiece cooling cover 82 is attached to the machining-tool supporting portion 14 (grinding wheel 40), on the other hand, the workpiece cooling cover 82 may be fixed to the machining-tool supporting portion 14. In either of these cases, it is preferable that the workpiece cooling cover 82 be movable or rotatable about the axis of the workpiece W, to a retreated position which is distant from the workpiece W, such that the workpiece cooling cover 82 does not interfere with an operation to set the workpiece in the machining apparatus.

The first and second cooling air supply devices 50, 52 do not have to be entirely independent of each other, but may include a common part. For example, the first and second cooling air supply devices 50, 52 may have respective delivery portions {(nozzle 54, conduit 56), (conduit 80)} which are independent of each other, while the two cooling air supply devices 50, 52 may have a common component such as the pump 58. Further, either one of the first and second cooling air supply devices 50, 52 may be modified to supply the cooling air to also the grinding wheel 42. In this case, a grinding-wheel cooling nozzle may be provided so as to be opposed to the grinding wheel 42, so that the cooling air is supplied from the grinding-wheel cooling nozzle to the outer circumferential surface of the grinding wheel 42. It is also possible to provide a third cooling air supply device which supplies the cooling air exclusively to the grinding wheel 42. If the grinding wheel 42 is provided with the cooling air, thermal expansion of the grinding wheel 42 due to grinding heat can be minimized, thereby improving the machining accuracy. Still further, the second cooling air supply device 52 may supply the cooling air to a portion other than the portion which is in the vicinity of the grinding point P and which portion is on the downstream side of the grinding point P in the rotating direction. For example, the second cooling air supply device 52 may supply the cooling air to a portion which is on the upstream side of the grinding point P, or to a portion which is spaced apart from the grinding point P in the axial direction. Depending upon the location of the portion to which the cooling air is supplied by the second cooling air supply device 52, it is possible to change the position of the workpiece cooling cover 82 as needed, or modify the workpiece cooling cover 82 to cover the workpiece W over at least an entire circumference thereof. In the latter case, the entirety of the workpiece W can be cooled, irrespective of the portion of the workpiece W to which the cooling air is initially supplied by the second cooling air supply device 52.

The temperature on the outer circumferential surface of the workpiece W is detected by a temperature detecting device 90. The temperature detecting device 90 is provided such that its detecting portion is positioned on the downstream side of the flange portion 86 of the workpiece cooling cover 82 in the rotating direction of the workpiece W, and such that the detecting portion is opposed to the outer circumferential surface of the workpiece W. The detecting portion may be of a contact type so as to be brought in contact with the outer circumferential surface of the workpiece W thereby detecting the surface temperature, or alternatively may be of a non-contact type so as to detect the surface temperature on the basis of a radiant energy radiated from the workpiece. Since the temperature detecting device 90 detects the temperature at a point lying on the circle on which the grinding point P lies, the temperature rise during the grinding operation can be accurately detected. Like the workpiece cooling cover 82, the temperature detecting device 90 is provided movably relative to the table 16.

Figure 6:
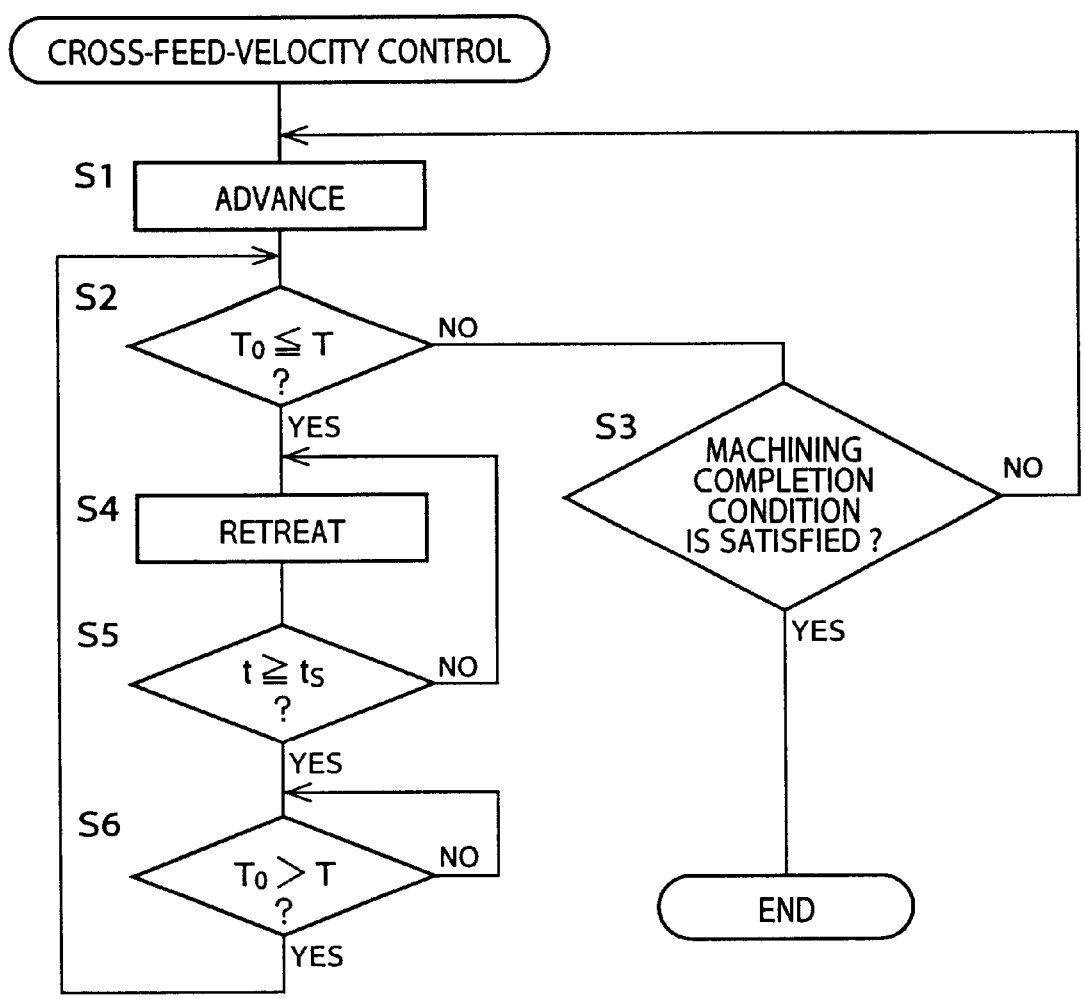
FIG. 6 is a flow chart showing a cross-feed-velocity control program stored in the ROM of the control device which is included in the above-described cylindrical grinding machine.

The present cylindrical grinding machine is controlled by a control device 100 which is principally constituted by a computer including a CPU 102, an input interface (I/F) 104, an output interface 106 and a memory 108. To the input I/F 104, there are connected the temperature detecting device 90, rotary encoders 110, 112 and other devices or members. The rotary encoder 110 detects the rotational shaft position of the servo motor 24, while the rotary encoder 112 detects the rotational shaft position of the servo motor 46. To the output I/F 106, there are connected the servo motors 24, 46 through driving circuits 114, 116, respectively. Further, to the output I/F 106, there is also connected a control portion of the second cooling air supply device 52 which is not shown. The memory 108 has stored therein various programs such as a table represented by the map of FIG. 5, a cross-feed-velocity control program represented by the flow chart of the FIG. 6, a cooling-condition control program which is not illustrated by a flow chart and which is executed for controlling the temperature and flow rate of the cooling air supplied from the second cooling air supply device 52.

The operation of the cylindrical grinding machine constructed as described above will be explained.

The workpiece W is ground as a result of the movement of the workpiece W in the Z-axis direction and the movement of the wheel spindle stock 40 in the X-axis direction. While the workpiece W is ground, the first cooling-air supply device 50 supplies the cooling air having a predetermined temperature (−30° C.) at a predetermined flow rate Q to the grinding point P, so that the grinding point P is cooled. And at the same time, the second cooling-air supply device 52 supplies the cooling air into the workpiece cooling cover 82, so that the outer circumferential surface of the rotating workpiece W is cooled. The temperature on the outer circumferential surface of the workpiece W subjected to the grinding operation is detected by the temperature detecting device 90 at a predetermined time interval, and a temperature signal representative of the detected temperature is inputted to the control device 100.

In the present embodiment, the flow rate and temperature of the cooling air supplied from the second cooling-air supply device 52 are controlled such that the surface temperature T of the workpiece W subjected to the grinding operation is held between an upper threshold value and a lower threshold value. The present embodiment is applicable to either of the traverse and plunge grindings.

Figure 4:
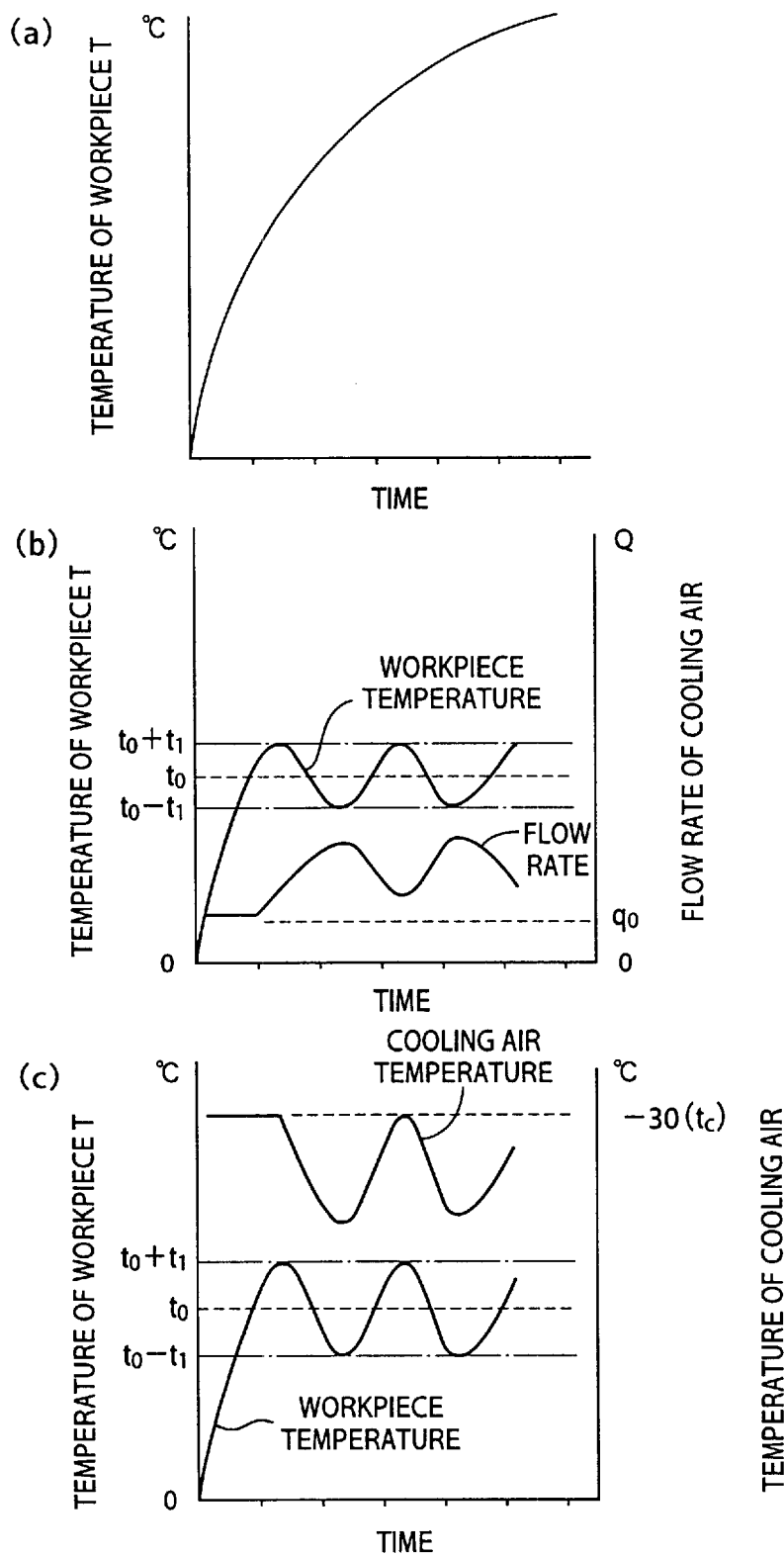
FIG. 4 is a view showing one example of the control in the above-described cylindrical grinding machine.

There will be first explained a case where the flow rate of the cooling air is controlled. The surface temperature T of the workpiece W rises as the time passes, as shown in FIG. 4(b). When the surface temperature T rises to the upper threshold value $(t_0+t_1)$, namely, when the temperature, which is represented by the temperature signal fed from the temperature detecting device 90 to the control device 100, is found to be equal to or higher than the temperature $(t_0+t_1)$, the second cooling-air supply device 52 is controlled by the control device 100 such that the flow rate Q of the cooling air is gradually increased. In this case, the flow regulating valve 67 is controlled in the second cooling-air supply device 52 such that the flow rate Q is gradually increased according to the command generated from the control device 100. While the grinding operation is continued with the flow rate Q of the cooling air being thus increased, the surface temperature T of the workpiece W is lowered as the time passes. When the surface temperature T is lowered to the lower threshold value $(t_0-t_1)$ or lower, namely, when the surface temperature T, which is represented by the temperature signal fed from the temperature detecting device 90 to the control device 100, is found to be equal to or lower than the temperature $(t_0-t_1)$, the second cooling-air supply device 52 is controlled by the control device 100 such that the flow rate Q of the cooling air is gradually decreased. While the grinding operation is continued with the flow rate Q of the cooling air being thus decreased, the surface temperature T of the workpiece W rises as the time passes. When the surface temperature T rises to the upper threshold value $(t_0+t_1)$, the second cooling-air supply device 52 is controlled such that the flow rate Q is gradually increased again.

The above-described control of the flow rate of the cooling air makes is possible to hold the surface temperature of the workpiece W between the upper threshold value $(t_0+t_1)$ and the lower threshold value $(t_0-t_1)$ during the grinding operation. If the workpiece W is ground without the cooling operation, the surface temperature T of the workpiece W rapidly rises as the time passes, as shown in FIG. 4(a). However, where the flow rate of the cooling air is controlled as in the present embodiment, the surface temperature T can be held between the upper threshold value $(t_0+t_1)$ and the lower threshold value $(t_0-t_1)$, thereby improving the machining accuracy. Further, the flow rate is prevented from being excessively increased, thereby reducing the energy amount consumed in the second cooling-air supply device 52.

It is noted that the flow rate may be increased or decreased by a predetermined amount, or may be increased or decreased according to a predetermined rule (function).

Further, it is also possible to control the flow rate according to a map shown in FIG. 5, on the basis of a change rate dT of the surface temperature T and a deviation of the surface temperature T from the temperature $t_0$ (target temperature). For example, in a case where the change rate dT lies between a predetermined upper limit $A_1$ and a predetermined lower limit $A_2$ while the deviation lies between a predetermined upper limit $B_1$ and a predetermined lower limit $B_2$, the grinding operation is continued without the flow rate being changed. In a case where the change rate dT is higher than the predetermined upper limit $A_1$ while the deviation is larger than the predetermined upper limit $B_1$, namely, the surface temperature T is higher than the target temperature $t_0$ by the predetermined upper limit $B_1$ or more, the flow rate is increased. Thus, the control of the flow rate according to the map permits the surface temperature T to be held almost equal to the target temperature $t_0$.

Figure 10:
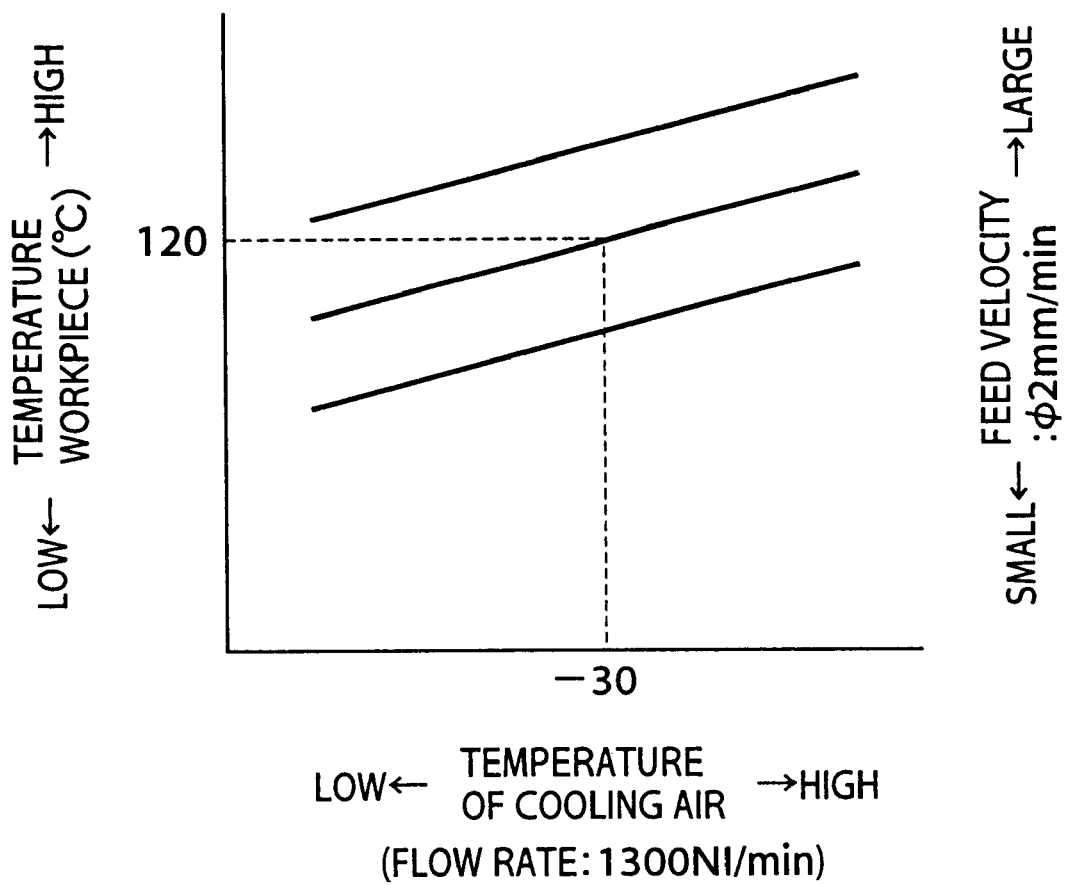
FIG. 10 is a view showing a relationship between the temperature of a cold gas blow, a movement velocity, and the temperature of a workpiece.

There will be next explained a case where the temperature of the cooling air is controlled. The workpiece W is ground similarly as in the above case where the flow rate of the cooling air is controlled. There is a known relationship between the temperature of the supplied cold gas blow and the surface temperature T of the workpiece W, as shown in FIG. 10. Where the feed velocity of the grinding wheel 42 is held constant, the surface temperature of the workpiece W rises as the temperature of the cold gas blow rises. That is, by lowering the temperature of the cold gas blow, it is possible to lower the temperature of the workpiece W in proportion to a fall in the temperature of the cold gas blow.

The surface temperature T of the workpiece W rises as the time passes, as shown in FIG. 4(c). When the surface temperature T rises to the upper threshold value $(t_0+t_1)$, the temperature of the cooling air is gradually lowered. In this case, the cooling device 66 of the second cooling-air supply device 52 is controlled according to a command generated from the control device 100, such that the temperature of the supplied air is gradually lowered. The grinding operation is continued with the temperature of the cooling air being thus lowered, whereby the surface temperature T of the workpiece W detected by the temperature detecting device 90 is lowered as the time passes. When the surface temperature T is lowered to the lower threshold value $(t_0-t_1)$, the cooling device 66 is controlled such that the temperature of the cooling air gradually rises. The grinding operation is then continued with the temperature of the cooling air thus rising. When the surface temperature T rises to the upper threshold value $(t_0+t_1)$, the temperature of the cooling air is gradually lowered again. Thus, the control of the temperature of the cooling air also makes it possible to hold the surface temperature of the workpiece W between the upper threshold value $(t_0+t_1)$ and the lower threshold value $(t_0-t_1)$ during the grinding operation.

As in the case of the control of the flow rate of the cooling air, the temperature of the cooling air may be increased or decreased by a predetermined amount, or may be increased or decreased according to a predetermined rule (function) or the map of FIG. 5. While the flow rate and temperature of the cooling air supplied from the second cooling-air supply device 52 are controlled independently of each other in the above description, both of the flow rate and temperature of the cooling air may be simultaneously controlled. If both of the flow rate and temperature are controlled, the cooling effect can be further improved. Further, it is also possible to control not only the second cooling-air supply device 52 but also the first cooling-air supply device 50 such that the flow rate and temperature of the cooling air supplied from the first cooling-air supply device 50 are also controlled. Still further, the grinding wheel 42 may also be provided with the cooling air, and the flow rate and temperature of the cooling air supplied to the grinding wheel 42 may be controlled. In these cases, the cooling effect can be further improved, resulting in an improved response to the control. Further, it is to be understood that the control map of FIG. 5 is given by way of example only, and the flow rate and temperature of the cooling air may be controlled according to other control map having a pattern different from that of the control map of FIG. 5.

There will be next explained a case where the velocity of movement of the wheel spindle stock 40 in the X-axis direction is controlled. Where the temperature of the supplied cooling air is held constant, the surface temperature of the workpiece W rises as the velocity of movement of the wheel spindle stock 40 in the X-axis direction is increased, as shown in FIG. 10. That is, it is possible to lower the surface temperature of the workpiece W, by reducing the movement velocity of the wheel spindle stock 40 in the X-axis direction. In the present embodiment, the predetermined flow rate Q of the cooling air having the predetermined temperature (−30° C.) is supplied to the grinding point P and also into the workpiece cooling cover 82.

After the grinding operation is initiated, the surface temperature T of the workpiece W rises as the time passes. When the surface temperature T of the workpiece W detected by the temperature detecting device 90 rises to a predetermined temperature $T_0$, the velocity of movement of the wheel spindle stock 40 in the X-axis direction is controlled by controlling the servo motor 46, so as to be reduced to a predetermined velocity. The reduction in the movement velocity of the wheel spindle stock 40 in the X-axis direction minimizes heat generated by the grinding. In this case, the movement velocity may be reduced to zero.

It is noted that the velocity of movement of the workpiece W in the Z-axis direction, in addition to the velocity of movement of the wheel spindle stock 40 in the X-axis direction, may be reduced. The reduction of the movement velocity of the workpiece W in the Z-axis direction also reduces the machining resistance and accordingly minimizes the rise in the surface temperature of the workpiece W. Further, it is also possible to control the flow rate and temperature of the supplied cooling air, by controlling at least one of the first and second cooling-air supply devices 50, 52.

Figure 7:
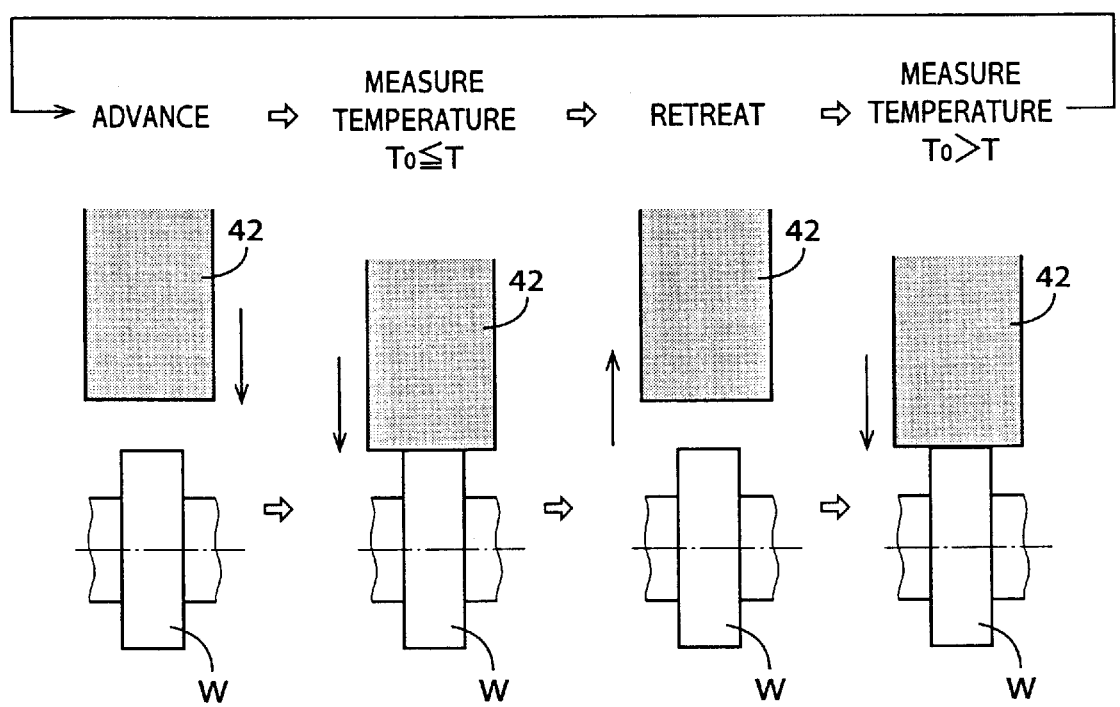
FIG. 7 is a view showing one example of the control in the above-described cylindrical grinding machine.

There will be next explained another control form where the velocity of movement of the wheel spindle stock 40 in the X-axis direction is reduced. This control form is applicable where a plunge grinding is executed. In the present embodiment, while the surface temperature T of the workpiece W is lower than the predetermined temperature $T_0$, the wheel spindle stock 40 is advanced (fed) so as to perform the grinding operation. When the surface temperature T becomes equal to or higher than the predetermined temperature $T_0$, the wheel spindle stock 40 retreats so as to suspend the grinding operation. When the surface temperature T becomes lower than the predetermined temperature $T_0$, the wheel spindle stock 40 is advanced again so that the grinding operation is resumed. The control in this form will be explained by reference to a flow chart of FIG. 6. The movement of the grinding wheel 42 is shown in FIG. 7.

In step 1 (hereinafter simply referred to as S1), the wheel spindle stock 40 is advanced at a predetermined feed velocity. S2 is then implemented to determine whether the surface temperature T of the workpiece W detected by the temperature detecting device 90 is equal to or higher than the predetermined temperature $T_0$. If the surface temperature T is lower than the predetermined temperature $T_0$, S3 is implemented to determine whether a machining completion condition is satisfied or not. In the present embodiment, when the accumulative feed amount (amount of advancing movement) of the wheel spindle stock 40 is increased to a predetermined amount, the machining completion condition is determined to be satisfied. That is, it is considered that the workpiece W has been ground by a predetermined ground amount when the wheel spindle stock 40 has been fed by the predetermined feed amount, on an assumption that the outside diameter of the grinding wheel 42 is held constant during the grinding operation. When S3 is implemented for the first time, a negative determination is obtained at S3 since the machining completion condition is not satisfied yet. The negative determination at S3 permits continuous advancing movement of the wheel spindle stock 40. Namely, while the surface temperature T is lower than the predetermined temperature $T_0$, the wheel spindle stock 40 is kept advanced. When the surface temperature T becomes higher than the predetermined temperature $T_0$, a positive determination is obtained at S2. The positive determination at S2 is followed by S4, 5 at which the advancing movement of the wheel spindle stock 40 is suspended and the wheel spindle stock 40 is then moved backward at a predetermined velocity for a predetermined time $t_s$ which is a time sufficient for the grinding wheel 42 to be moved back to its retreated position distant from the workpiece W. S6 is then implemented to determine whether the surface temperature T of the workpiece W is lower than the predetermined temperature $T_0$. As long as the surface temperature T is equal to or higher than the predetermined temperature $T_0$, a negative determination is obtained at S6, whereby the wheel spindle stock 40 is held at the retracted position. When the surface temperature T becomes lower than the predetermined temperature $T_0$, a positive determination is obtained at S6, whereby the advancing movement of the wheel spindle stock 40 is resumed. That is, the wheel spindle stock 40 retreats when the surface temperature T of the workpiece W has become equal to or higher than the predetermined temperature $T_0$, and the wheel spindle stock 40 is advanced when the surface temperature T of the workpiece W has become lower than the predetermined temperature $T_0$. This results in a reduction of the feed velocity of the grinding wheel 42. In the present embodiment in which the workpiece W is intermittently ground on the basis of the surface temperature T of the workpiece W, the machining resistance can be made smaller than where the workpiece W is continuously ground. Further, the surface temperature of the workpiece W can be held almost constant.

Although the present embodiment is adapted such that the movement of the wheel spindle stock 40 in the X-axis direction is controlled depending upon whether the surface temperature T is equal to or higher than the predetermined temperature $T_0$ or not, it is possible to provide a hysteresis in the control. For example, the wheel spindle stock 40 is moved backward when the surface temperature T is equal to or higher than a first predetermined temperature, and is then moved forward when the surface temperature T becomes equal to or lower than a second predetermined temperature which is lower than the first predetermined temperature. This control permits the movement direction of the wheel spindle stock 40 to be changed less frequently.

Further, it is also possible to switch the continuous machining into the intermittent machining when the surface temperature T becomes equal to or higher than the predetermined temperature $T_0$. The intermittent machining can be executed, even without taking account of the temperature of workpiece W, such that the wheel spindle stock 40 is moved alternately forward and backward at a predetermined time interval. Also in this case, the variation in the surface temperature of the workpiece W can be minimized, thereby improving the machining accuracy. Further, the advancing movement of the wheel spindle stock 40 can be suspended when the surface temperature T becomes equal to or higher than the predetermined temperature $T_0$.

In the present embodiment, as described above, the two movement devices 26, 49 (the pairs of rails 22, 44, the servo motors 24, 46 and the feed screws 25, 48) constitute a relative movement device, and the control device 100 constitutes a machining-condition control device. The machining-condition control device serves as a cooling-condition control device and a relative-movement-condition control device. The movement device 49 which moves the wheel spindle stock 40 can be regarded as a wheel-spindle-stock driving device.

In addition to the control of the feed velocity of the wheel spindle stock 40, it is also possible to control the feed velocity of the workpiece W, or control at least one of the temperature and flow rate of the cooling air supplied from at least one of the first and second cooling-air supply devices 50, 52. Further, only the velocity of the relative movement may be controlled without controlling either of the temperature and flow rate of the cooling air. In this case, the first and second cooling-air supply devices 50, 52 are not controllable in the temperature and flow rate of the cooling air supplied therefrom. Still further, the second cooling-air supply device 52 is not essential. If the second cooling-air supply device 52 is not provided, the workpiece cooling cover 82 is no longer necessary. Still further, a gas other than the air can be supplied. Still further, the wheel spindle stock 40 can be adapted to be movable in the Z-axis direction. Still further, at least one of the wheel spindle stock 40 and the table 16 can be adapted to be rotatable relative to the bed 10. Still further, the present embodiment is applicable not only to the cylindrical grinding machine but also to other machining apparatus such as a cutting machine in which a lathe cutting tool is used as the machining tool.

Then, one common embodiment of the present invention in the form of a cold-gas-blow-cooling type machining apparatus will be explained. This cold-gas-blow-cooling type machining apparatus is capable of carrying out a cold-gas-blow cooling machining process as one common embodiment of the present invention.

Figure 8:
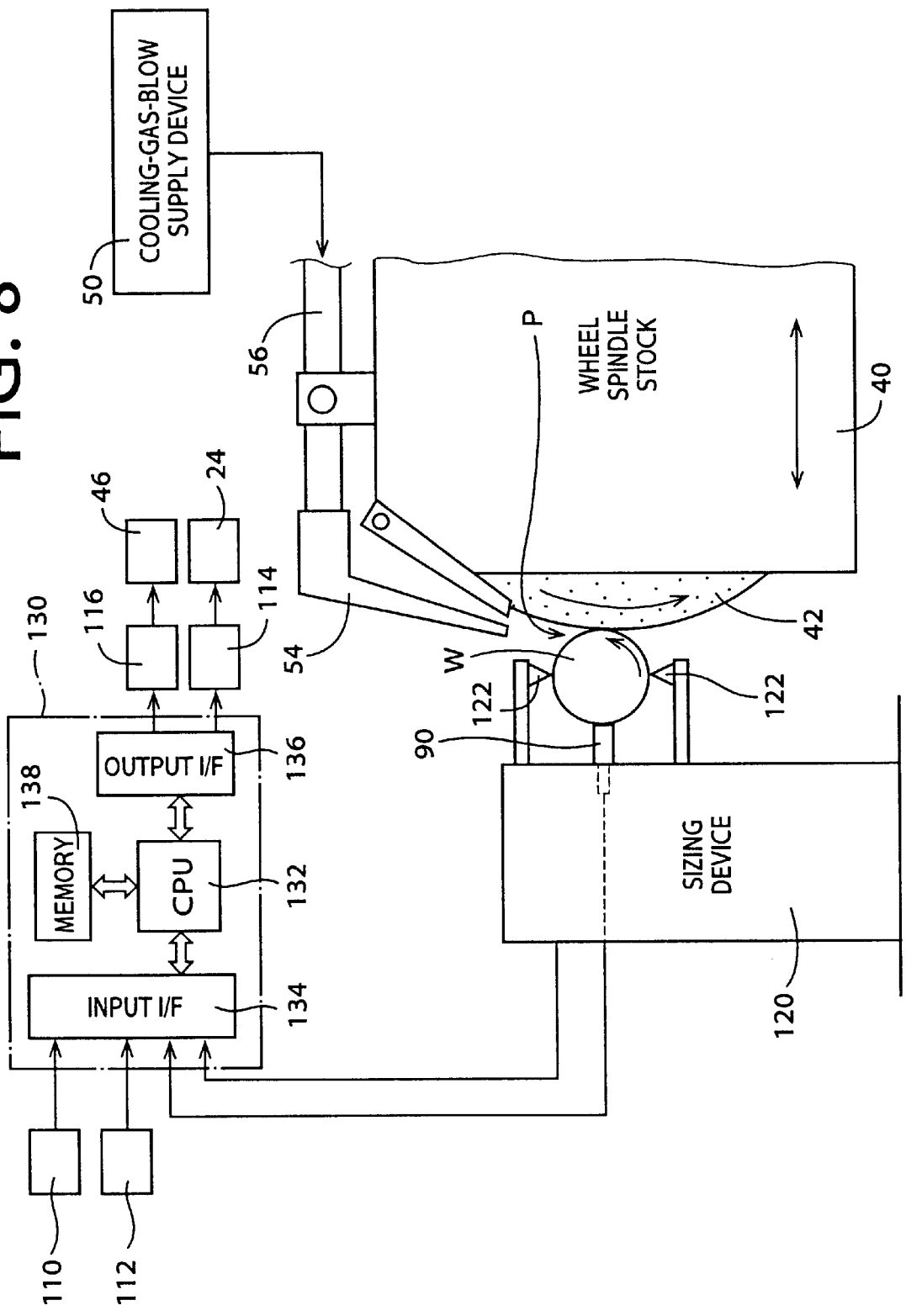
FIG. 8 is a view schematically illustrating an essential part of a cold-gas-blow-cooling type machining apparatus in the form of a cylindrical grinding machine according to another embodiment of the present invention.

In a cylindrical grinding machine constructed according to the present embodiment, there is provided a sizing device 120, as shown in FIG. 8. The sizing device 120 is located on one of opposite sides of the axis of the table 16 which is remote from the wheel spindle stock 40, and is movable relative to the table 16 in the Z-axis direction and the X-axis direction. The sizing device 120 includes a pair of size detecting probes 122, which are brought into contact with the outer circumferential surface of the workpiece W at the upper and lower positions, respectively, whereby the outside diameter of the workpiece W is detected. The sizing device 120 is moved at a predetermined time interval, from its retreated position distant from the workpiece W, to its detecting position at which the sizing device 120 can be in contact with the workpiece W. Thus, the sizing device 120 is moved from the retreated position to the detecting position, so as to detect the outside diameter of the workpiece W. In the present embodiment, the outside diameter of the workpiece W is detected by the sizing device 120 almost simultaneously with the detection of the surface temperature T of the workpiece W by the temperature detecting device 90.

It is noted that the sizing device may be of a non-contact type which detects the outside diameter of the workpiece W without its pair of sizing detecting probes being in contact with the outer circumferential surface of the workpiece W.

The cylindrical grinding machine of the present embodiment is substantially identical with that of the above-described embodiment, except that the second cooling-air supply device 52 and the workpiece cooling cover 82 are not provided.

A control device 130 is principally constituted by a computer including a CPU 132, an input I/F 134, an output I/F 136 and a memory 138. To the input I/F 134, there are connected the temperature detecting device 90, the sizing device 120, the rotary encoders 110, 112 and other devices or members. To the output I/F 136, there are connected the servo motors 24, 46 through driving circuits 114, 116, respectively, as in the above-described embodiment. The memory 138 has stored therein various programs such as a grinding control program represented by a flow chart of FIG. 9.

In the present embodiment, a provisional target-dimension of the workpiece W upon completion of machining is obtained by calculation. The grinding operation on the workpiece W is terminated when the outside diameter of the workpiece W becomes equal to the provisional target-dimension. The workpiece W is heated due to its machining and thermally expanded. In other words, the workpiece W is contracted when the temperature of the workpiece W is lowered to a standard temperature. In this view, if the provisional target-dimension were always the same irrespective of whether the temperature of the heated workpiece is high or low, the dimension of the workpiece (final product) at the standard temperature would inevitably vary. For preventing the variation in the dimension of the workpiece, the provisional target-dimension of the workpiece is obtained on the basis of the temperature of the workpiece during the machining operation, coefficient of linear expansion of the workpiece, and a definitive target-dimension of the ground workpiece at the standard temperature. The workpiece W is then ground such that the outside diameter is equal to the obtained provisional target-dimension. Thus, it is possible to minimize the variation in the dimension of the workpiece W at the standard temperature, irrespective of the temperature during the machining operation, resulting in an improved machining accuracy of the workpiece W.

The provisional target-dimension d upon completion of machining can be obtained according to the following equation:

$$d = D \times \{1 + \alpha(t - T)\}$$

wherein T, D, α and t represent the standard temperature, the definitive target-dimension of the workpiece at the standard temperature T, the coefficient of linear expansion of the workpiece, and the surface temperature of the workpiece during the machining operation, respectively.

In the present embodiment, a final position $X_n$ is obtained on the basis of the provisional target-dimension d, the outside diameter of the workpiece W detected by the sizing device 120, and the position of the wheel spindle stock 40 upon detection of the outside diameter, so that the wheel spindle stock 40 is moved to be positioned at the final position $X_n$. The outside diameter of the workpiece W is made equal to the provisional target-dimension d when the wheel spindle stock 40 is positioned at the final position $X_n$. In the present embodiment, the provisional target-dimension d and the final position $X_n$ are repeatedly obtained during the grinding operation, so that it is repeatedly determined whether the wheel spindle stock 40 has actually reached the final position $X_n$ during the grinding operation. The provisional target-dimension d is increased as the temperature of the workpiece W rises during the grinding operation, whereby the final position $X_n$ is shifted in a direction in which the amount of the movement of the wheel spindle stock 40 relative to the workpiece W is reduced.

It is preferable that the present embodiment be applied where a plunge grinding is performed. During the grinding operation, the first cooling-air supply device 50 supplies the cooling air having a predetermined temperature at a predetermined flow rate.

Figure 9:
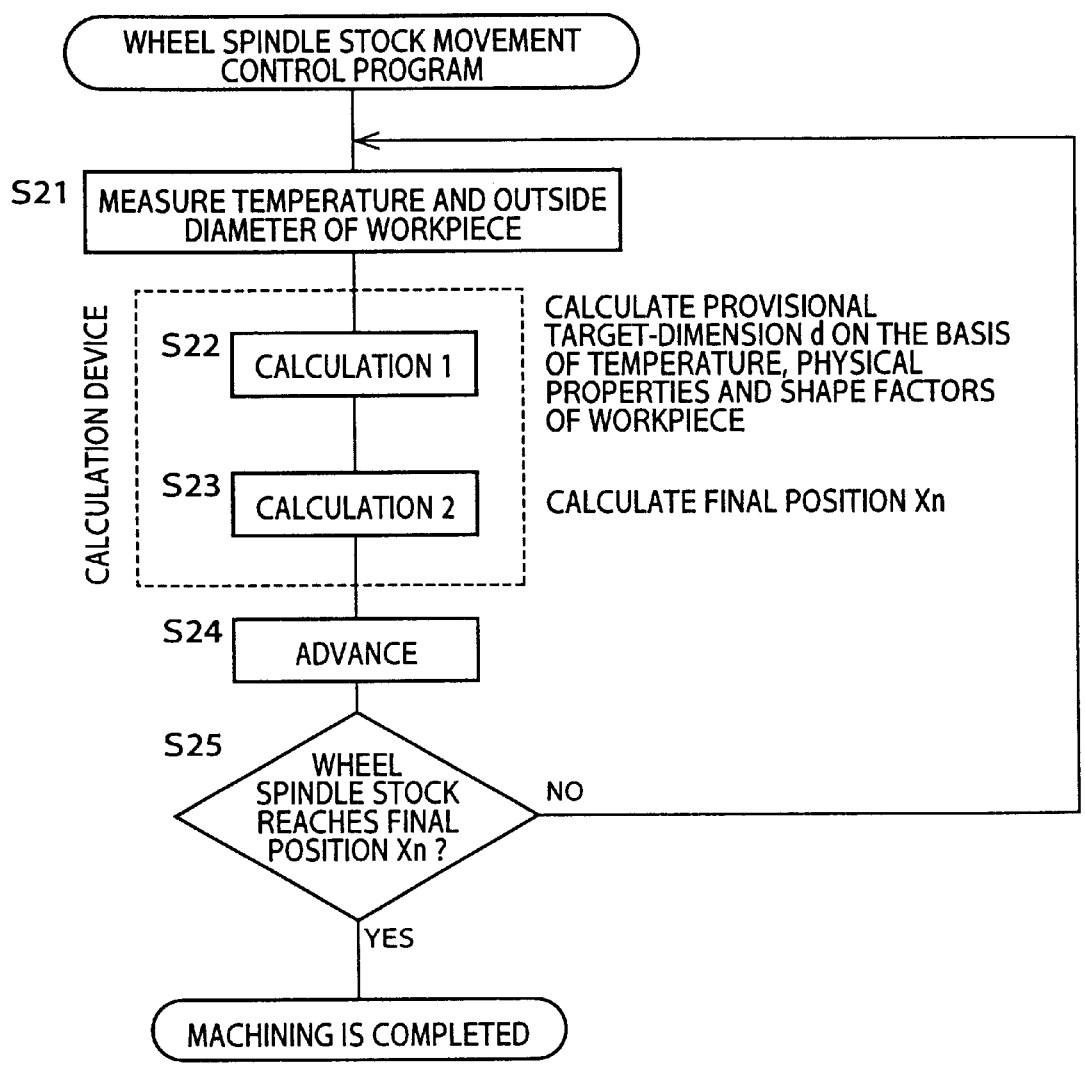
FIG. 9 is a flow chart showing a cross-feed-velocity control program stored in ROM of a control device which is included in the above-described cylindrical grinding machine.

As shown in a flow chart of FIG. 9, the surface temperature and the outside diameter of the workpiece W are detected at S21. The provisional target-dimension d is then calculated according to the above-described equation at S22. The final position $X_n$ is then calculated on the basis of the provisional target-dimension d, the outside diameter and the current position of the wheel spindle stock 40 at S23. The servo motor 46 is then driven whereby the wheel spindle stock 40 is moved forward at a predetermined velocity at S24. S25 is then implemented to determine whether the wheel spindle stock 40 has reached the final position $X_n$, in accordance with the current position of the wheel spindle stock 40 which is detected based on a signal generated from the encoder 112. When the S25 is implemented for the first time, a negative determination is obtained at S25 since the wheel spindle stock 40 has not reached the final position $X_n$ yet. The negative determination at S25 causes the control flow to go back to S21. Thus, the surface temperature and the outside diameter of the workpiece W are detected again, and the provisional target-dimension d and the final position $X_n$ are obtained by calculation. When the wheel spindle stock 40 reaches the final position $X_n$, a positive determination is obtained at S25 whereby the grinding operation is terminated. In the present embodiment, the workpiece W is thus machined such that the outside diameter is equal to the provisional target-dimension d which is determined on the basis of the temperature during the machining operation, whereby the machining accuracy of the workpiece is improved.

In the present embodiment, as described above, the control device 130 constitutes the machining-condition control device. The control device 130 includes a portion which implements S22 of the flow chart representing a grinding control program and a portion which stores therein S22. These portions constitute a provisional target-dimension determining portion. The control device 130 further includes a portion which implements S22–25 and a portion which stores therein S23–25. These portions and the encoder 112 constitute a provisional target-dimension-basis relative-movement control portion. The portions of the control device 130 which implement S22–23 and store therein S22–23 can be referred to as a calculation device.

In the above-described embodiment, when the wheel spindle stock 40 has reached the obtained final position $X_n$ in the feed direction, the forward movement of the wheel spindle stock 40 is finished. However, the above-described embodiment may be modified such that the wheel spindle stock 40 is moved forward until the outside diameter detected by the sizing device 120 has become equal to the provisional target-dimension d. Further, the above-described embodiment is applicable to a cylindrical grinding machine equipped with the second cooling-air supply device and the workpiece cooling covering member. In this case, the workpiece cooling covering member may be moved away from the workpiece W at a predetermined time interval, so as to detect the outside diameter of the workpiece W. Still further, it is also possible to modify the present embodiment such that the provisional target-dimension d and the final position $X_n$ are obtained by a hardware circuit arrangement.

While the embodiments of the present invention have been described above for illustrative purpose only, it is to be understood that the present invention may be embodied in the modes as described above (in the DISCLOSURE OF INVENTION), or with various changes and modifications, which may occur to those skilled in the art.

What is claimed is:

1. A cold-gas-blow cooling machining apparatus comprising a relative movement device which moves a workpiece and a machining tool relative to each other, and a cold-gas-blow supply device which supplies a cold gas blow to a machining point at which said workpiece is machined by said machining tool, said machining apparatus comprising:

a workpiece-temperature detecting device which detects a temperature of said workpiece; and a machining-condition control device which controls at least said cold-gas-blow supply device, on the basis of said temperature of said workpiece which is detected by said workpiece-temperature detecting device;

and wherein said machining-condition control device includes a cooling-condition control device which controls at least one of a temperature and a flow rate of said cold gas blow, by controlling said cold-gas-blow supply device.

2. A cold-gas-blow cooling machining apparatus according to claim 1, wherein said relative movement device includes a spindle which holds said workpiece and rotates said workpiece about an axis of said workpiece.

3. A cold-gas-blow cooling machining process of machining a workpiece, which is rotated by a spindle about an axis of said workpiece, by a machining tool with a relative movement of said workpiece and said machining tool, while supplying a cold gas blow to a machining point at which said workpiece is machined by said machining tool, said machining process comprising:

a step of controlling at least one of a temperature and a flow rate of said cold gas blow, on the basis of a temperature of said workpiece.

4. A cold-gas-blow cooling machining apparatus according to claim 1, wherein said machining-condition control device includes a relative-movement-condition control device which controls said relative movement device on the basis of said temperature of said workpiece detected by said workpiece-temperature detecting device, so as to control at least one of a velocity and an amount of relative movement of said workpiece and said machining tool.

5. A cold-gas-blow cooling machining apparatus according to claim 1, wherein said machining-condition control device includes a provisional target-dimension determining portion which calculates a provisional target-dimension of said workpiece as a target dimension of said workpiece upon completion of machining of said workpiece, on the basis of said temperature of said workpiece detected by said workpiece-temperature detecting device, and a provisional-target-dimension-basis relative-movement control portion which controls said relative movement device on the basis of said provisional target-dimension which is determined by said provisional-target-dimension determining portion such that said machining is completed when said workpiece has said provisional target-dimension.

6. A cold-gas-blow cooling machining apparatus according to claim 1, wherein said cold-gas-blow supply device includes a first cold-gas-blow supply device which supplies said cold gas blow to said machining point, and a second cold-gas-blow supply device which supplies said cold gas blow to a portion of said workpiece that is different from said machining point.

7. A cold-gas-blow cooling machining process according to claim 3, further comprising a step of monitoring said temperature of said workpiece, and holding a variation in said temperature caused by machining of said workpiece by said machining tool, within a predetermined range.

8. A cold-gas-blow cooling machining process according to claim 3, further comprising a step of controlling at least one of an amount of said relative movement and a velocity of said relative movement, on the basis of said temperature of said workpiece.

9. A cold-gas-blow cooling machining process according to claim 3, further comprising a step of determining a provisional target-dimension of said workpiece as a target dimension of said workpiece upon completion of machining of said workpiece, on the basis of said temperature of said workpiece, a coefficient of linear expansion of said workpiece, and a definitive target-dimension of said workpiece as a target dimension of said workpiece at a standard temperature, and a step of controlling said amount of said relative movement of said workpiece and said machining tool, on the basis of said provisional target-dimension.

10. A cold-gas-blow cooling machining process according to claim 3, wherein said cold gas blow is supplied to said machining point and also a portion of said workpiece which is distant from said machining point.

11. A cold-gas-blow cooling machining apparatus comprising a relative movement device which moves a workpiece and a machining tool relative to each other, and a cold-gas-blow supply device which supplies a cold gas blow to a machining point at which said workpiece is machined by said machining tool, said machining apparatus comprising:

a workpiece-temperature detecting device which detects a temperature of said workpiece; and a machining-condition control device which controls at least said cold-gas-blow supply device, on the basis of said temperature of said workpiece which is detected by said workpiece-temperature detecting device, and wherein said machining-condition control device includes a cooling-condition control device which controls at least a flow rate of said cold gas blow, by controlling said cold-gas-blow supply device.

12. A cold-gas-blow cooling machining process of machining a workpiece, which is attached to a spindle, by a machining tool with a relative movement of said workpiece and said machining tool, while supplying a cold gas blow to a machining point at which said workpiece is machined by said machining tool, said machining process comprising:

controlling at least a flow rate of said cold-gas blow, on the basis of a temperature of said workpiece.

13. A cold-gas-blow-cooling machining apparatus according to claim 1, wherein said cold-gas-blow supply device includes:

a cooling device which cools an air that has been supplied from an air source; and a delivery portion through which the cooled air as said cold gas blow is supplied to the machining point.

14. A cold-gas-blow-cooling machining apparatus according to claim 2, wherein said workpiece-temperature detecting device includes a detecting portion which is positioned to be opposed to an outer circumferential surface of said workpiece that is held and rotated by said spindle.

15. A cold-gas-blow-cooing machining apparatus according to claim 14, wherein said detecting portion of said workpiece-temperature detecting device and said workpiece are movable relative to each other in an axial direction of said workpiece, and wherein said detecting portion of said workpiece-temperature detecting device and said machining tool are unmovable relative to each other in said axial direction, so that said detecting portion can detect said temperature at a point positioned in the same position relative to the machining point in said axial direction.

16. A cold-gas-blow-cooling machining apparatus according to claim 1, wherein said cold-gas-blow supply device includes a regulating valve which is controlled by said cooling-condition control device such that the flow rate of said cold gas blow is gradually changed on the basis of said temperature of said workpiece which is detected by said workpiece-temperature detecting device.

17. A cold-gas-blow cooling machining apparatus according to claim 2, wherein said relative movement device further includes a machining tool supporting portion which holds a grinding wheel as said machining tool such that an axis of said grinding wheel is held in parallel with said axis of said workpiece held by said spindle.

18. A cold-gas-blow cooling machining process according to claim 7, wherein said step of monitoring said temperature of said workpiece includes a step of detecting said temperature at a point positioned in the same position relative to the machining point in an axial direction of said workpiece.

19. A cold-gas-blow cooling machining process according to claim 3, wherein said step of controlling at least one of a temperature and a flow rate of said cold gas blow includes a step of gradually changing the flow rate of said cold gas blow on the basis of said temperature of said workpiece.

20. A cold-gas-blow cooling machining process according to claim 3, wherein said machining tool is a grinding wheel, and wherein said workpiece and said grinding wheel are moved relative to each other while axes of said workpiece and said grinding wheel are held in parallel with each other, so that said workpiece is ground by said grinding wheel.

* * * * *